(12) United States Patent
Daly et al.

(10) Patent No.: US 11,449,106 B1
(45) Date of Patent: Sep. 20, 2022

(54) METALLIC BACK COVER, SUCH AS FOR PHONES AND TABLETS

(71) Applicant: CORNING INCORPORATED, Corning, NY (US)

(72) Inventors: Colin Brendan Daly, San Bruno, CA (US); Geraint Owen, Palo Alto, CA (US); Dean Michael Thelen, Addison, NY (US)

(73) Assignee: Corning Incorporated, Corning, NY (US)

( * ) Notice: Subject to any disclaimer, the term of this patent is extended or adjusted under 35 U.S.C. 154(b) by 455 days.

(21) Appl. No.: 16/521,706

(22) Filed: Jul. 25, 2019

Related U.S. Application Data

(60) Provisional application No. 62/712,594, filed on Jul. 31, 2018.

(51) Int. Cl.
| | | |
|---|---|---|
| *G06F 7/00* | (2006.01) | |
| *G06F 1/16* | (2006.01) | |
| *H02J 7/02* | (2016.01) | |
| *H02J 50/10* | (2016.01) | |
| *H02J 7/00* | (2006.01) | |
| *H04B 1/3883* | (2015.01) | |
| *H04M 1/02* | (2006.01) | |
| *H01F 38/14* | (2006.01) | |

(52) U.S. Cl.
CPC .......... *G06F 1/1656* (2013.01); *G06F 1/1684* (2013.01); *H01F 38/14* (2013.01); *H02J 7/0042* (2013.01); *H02J 7/025* (2013.01); *H02J 50/10* (2016.02); *H04B 1/3883* (2013.01); *H04M 1/0283* (2013.01); *G06F 1/1626* (2013.01); *H04M 2201/38* (2013.01)

(58) Field of Classification Search
USPC .......................... 320/106, 107, 108, 109, 110
See application file for complete search history.

(56) References Cited

U.S. PATENT DOCUMENTS

| | | |
|---|---|---|
| 8,270,914 B2 | 9/2012 | Pascolini et al. |
| 8,912,957 B2 | 12/2014 | Lin |
| 9,048,542 B2 | 6/2015 | Han et al. |
| 9,787,347 B1 | 10/2017 | Kim |
| 9,871,384 B2 | 1/2018 | Von Novak, III et al. |
| 9,882,415 B2 | 1/2018 | Olgun et al. |
| 10,334,752 B2 | 6/2019 | Shin et al. |
| 2013/0300602 A1 | 11/2013 | Zhou et al. |

(Continued)

FOREIGN PATENT DOCUMENTS

| | | | |
|---|---|---|---|
| CN | 205723962 U | 11/2016 | |
| CN | 206698539 U | * 12/2017 | ........... G06F 1/1656 |

(Continued)

OTHER PUBLICATIONS

"Qualcomm Becomes First Company to Enable Wireless Charging for Mobile Devices With Metal Cases"; Qualcomm; 2015; 5 Pages.

(Continued)

*Primary Examiner* — Brian Ngo
(74) *Attorney, Agent, or Firm* — Russell Magaziner

(57) ABSTRACT

A cellular phone or tablet computer device includes a front face having a display screen, a back cover opposite the front face, and componentry between the front face and back cover. The back cover is metallic and includes pieces of metal separated from one another by electrical insulation.

19 Claims, 4 Drawing Sheets

(56) References Cited

U.S. PATENT DOCUMENTS

| | | | |
|---|---|---|---|
| 2015/0137742 A1* | 5/2015 | Tseng | H02J 7/04 320/108 |
| 2016/0268814 A1 | 9/2016 | McCauley et al. | |
| 2017/0047785 A1 | 2/2017 | Twelker et al. | |
| 2017/0062953 A1 | 3/2017 | Teshima et al. | |
| 2017/0077727 A1 | 3/2017 | Kim et al. | |
| 2017/0201011 A1 | 7/2017 | Khripkov et al. | |
| 2017/0250720 A1 | 8/2017 | Michaeli et al. | |

FOREIGN PATENT DOCUMENTS

| | | | | |
|---|---|---|---|---|
| WO | WO-2016064553 A1 * | 4/2016 | | H02J 5/005 |
| WO | 2016/159551 A1 | 10/2016 | | |
| WO | 2017/146916 A1 | 8/2017 | | |

OTHER PUBLICATIONS

A4Wp Wireless Charging; Electronics Notes; 3 Pages; Downloaded Sep. 27, 2019; https://www.electronics-notes.com/articles/equipment-items-gadgets/wireless-battery-charging/a4wp-wireless-charging.php.

El-Halwagy et al.; "Investigation of Wideband Substrate-Integrated Vertically-Polarized Electric Dipole Antenna and Arrays for mm-WAVE 5G Mobile Devices", IEEE Access, vol. 6, Dec. 2017, pp. 2145-2157.

Hong et al.; "Study and Prototyping of Practically Large-Scale mmWAVE Antenna Systems for 5G Cellular Devices", IEEE Communications Magazine, Sep. 2014; pp. 63-69.

Jeong et al.; "Wireless Charging of a Metal-Body Device"; IEEE Transactions on Microwave Theory and Techniques, vol. 65, No. 4; (2017) pp. 1077-1086.

Mao et al.; "Flexible and Efficient 6.78MHz Wireless Charging for Metal-Cased Mobile Devices Using Controlled Resonance Power Architecture"; IEEE, 2017; 4 Pages.

Marnat et al.; "V-Band Transceiver Modules With Integrated Antennas and Phased Arrays for mmWAVE Access in 5G Mobile Networks", IEEE EUCAP, Jul. 2017; 5 Pages.

Novel Integrated Design of Dual-Band Dual-Polarization mm-WAVE Antennas in Non-mm-WAVE Antennas (AiA) for a 5G Phone With a Metal Frame "; vivo Mobile Communications Co. Ltd.; 4 Pages; Date Unknown".

Valdes-Garcia et al.; "Circuit and Antenna-in-Package Innovations for Scaled mmWAVE 5G Phased Array Modules"; IEEE, (2018) 8 PAges.

Wikipedia, Qi (Standard) 6 Pages; Downloaded Sep. 27, 19; https://en.wikipedia.org/w/index.php?title=Special:ElectronPdf&page=Qi+%28standard.

Wikipedia; Inductive Charging; 11 Pages; Downloaded Sep. 27, 2019; https://en.wikipedia.org/wiki/nductive_charging.

* cited by examiner

METALLIC BACK COVER, SUCH AS FOR PHONES AND TABLETS

RELATED APPLICATIONS

This application claims the benefit of priority under 35 U.S.C. § 119 of U.S. Provisional Application Ser. No. 62/712,594 filed on Jul. 31, 2018 the contents of which are relied upon and incorporated herein by reference in their entirety as if fully set forth below.

BACKGROUND AND SUMMARY

Metallic back covers for cellular phones, tablet computers, and the like may have certain aesthetic appeal, such as by feeling or appearing sturdy. However, metal of such back covers may impede wireless charging via induction through the back cover because the metal interferes with magnetic fields. Some wireless charging devices are designed with glass or plastic back covers instead. However, such covers may lack aesthetic of metal. Accordingly, Applicants believe a need exists for metallic back covers for cellular phones, tablet computers, and the like that readily allow for inductive charging of the devices through the back covers or provide other benefits and solve other challenges as described herein.

At least one aspect of the present disclosure relates to a cellular phone or tablet computer device that includes a front face having a display screen, a back cover opposite the front face, and componentry between the front face and back cover. The back cover is metallic and includes pieces of metal separated from one another by electrical insulation. The pieces of metal have front and back major surfaces joined by side edges, and are oriented such that the front major surfaces face the componentry and the back major surfaces face away from the componentry. In some embodiments, the back major surfaces of the pieces of metal each have an area less than 4 cm$^2$.

At least a second aspect of the present disclosure relates to a cellular phone or tablet computer device that includes a front face having a display screen, a back cover opposite the front face, and componentry between the front face and back cover. The back cover is metallic and includes pieces of metal having front and back major surfaces joined by side edges. The pieces of metal are oriented such that the front major surfaces face the componentry and the back major surfaces face away from the componentry. Perimeters of each of the back major surfaces of the pieces of metal are fully surrounded by electrical insulation. A thickness of each of the pieces of metal is less than 2 mm in some embodiments, where the thickness is a distance between respective major surfaces of the piece of metal. The back major surfaces of the pieces of metal each have a cross-sectional dimension less than 3 cm and another cross-sectional dimension of at least 2 mm in some embodiments.

At least a second aspect of the present disclosure relates a cellular phone or tablet computer device that includes a front face having a display screen, a back cover opposite the front face, and componentry between the front face and back cover. The back cover includes five or more pieces of metal, where the pieces of metal have front and back major surfaces joined by side edges, overlay at least 80% of the back cover, and each do not directly contact any of the other pieces of metal in some embodiments. Despite the back cover including the pieces of metal, the componentry includes a coil for receiving power via induction through the back cover.

Additional aspects of the present disclosure relate to a metallic back cover, such as for cellular phone or tablet computer device, where the back cover includes pieces of metal separated from one another by electrical insulation, such as where perimeters of major surfaces of each of the pieces of metal are fully surrounded by the electrical insulation and the pieces of metal each do not directly contact any of the other pieces of metal.

Additional features and advantages are set forth in the Detailed Description that follows, and in part will be readily apparent to those skilled in the art from the description or recognized by practicing the embodiments as described in the written description and claims hereof, as well as the appended drawings. Still other aspects of the present disclosure relate to a method of manufacturing such articles. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings of the Figures illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the following Detailed Description and Figures, which illustrate exemplary embodiments in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures or described in the text relating to one of the embodiments may well be applied to other embodiments shown in another of the Figures or described elsewhere in the text.

Figure 1:
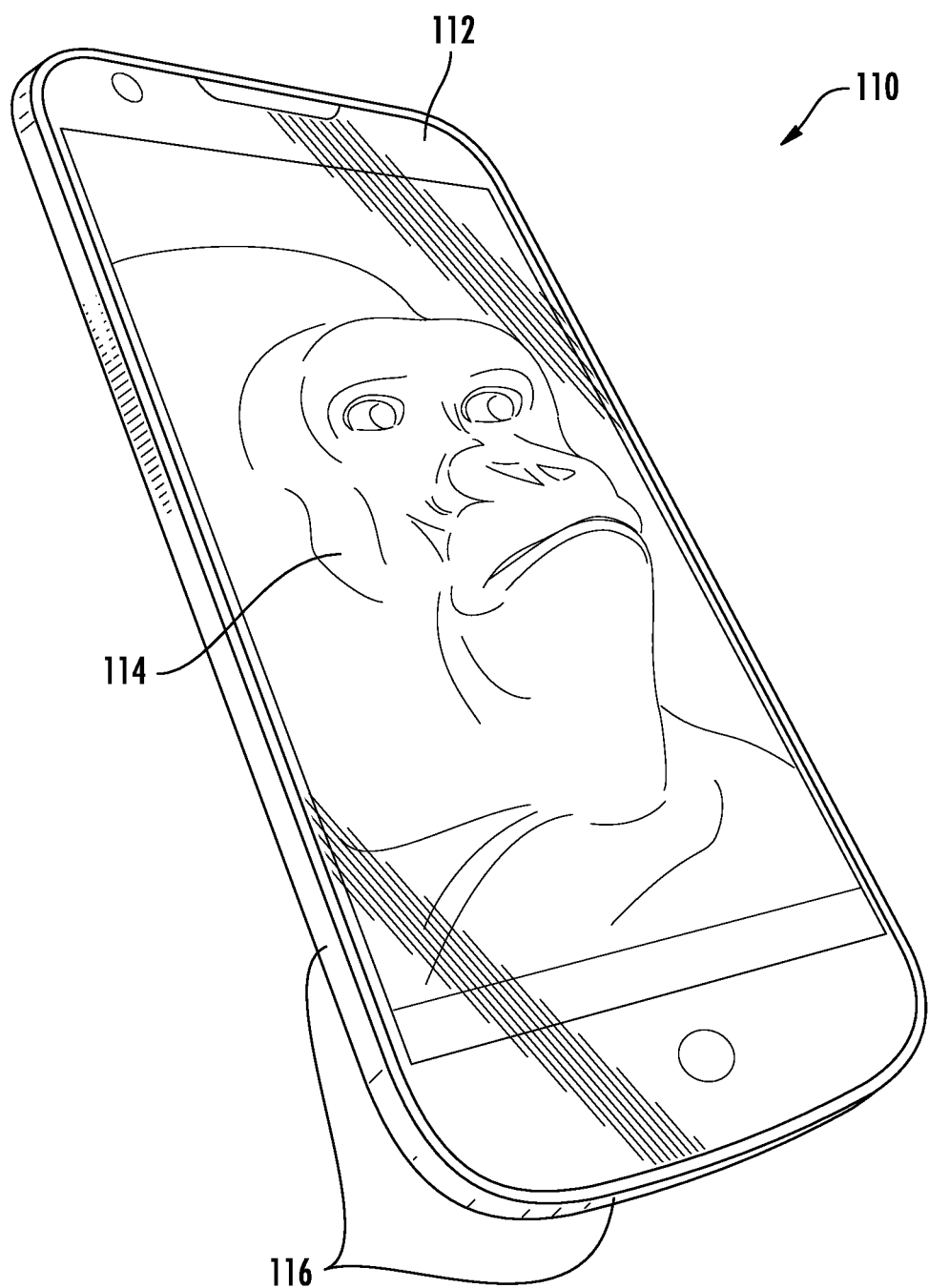
FIG. 1 is a perspective view of a device, such as a cellular phone or tablet computer.

Referring to FIG. 1, a device 110, such as a cellular phone or tablet computer device, may include a front face 112 (also called front side, face, top) having a display screen 114 (also called screen, monitor). In some such devices, the front face 112 may be relatively flat, while in others it may be curved and/or flexible such as for a flexible device. The display screen 114 may extend beyond the front face 112, such as around sides 116 (also called edges) of the device, for example. The front face 112 may include sensors, cameras, speakers, and/or other features. Further, the display screen 114 may include a cover glass with coatings, liquid crystals, organic light emitting diodes, quantum dots, and/or other features.

Figure 2:
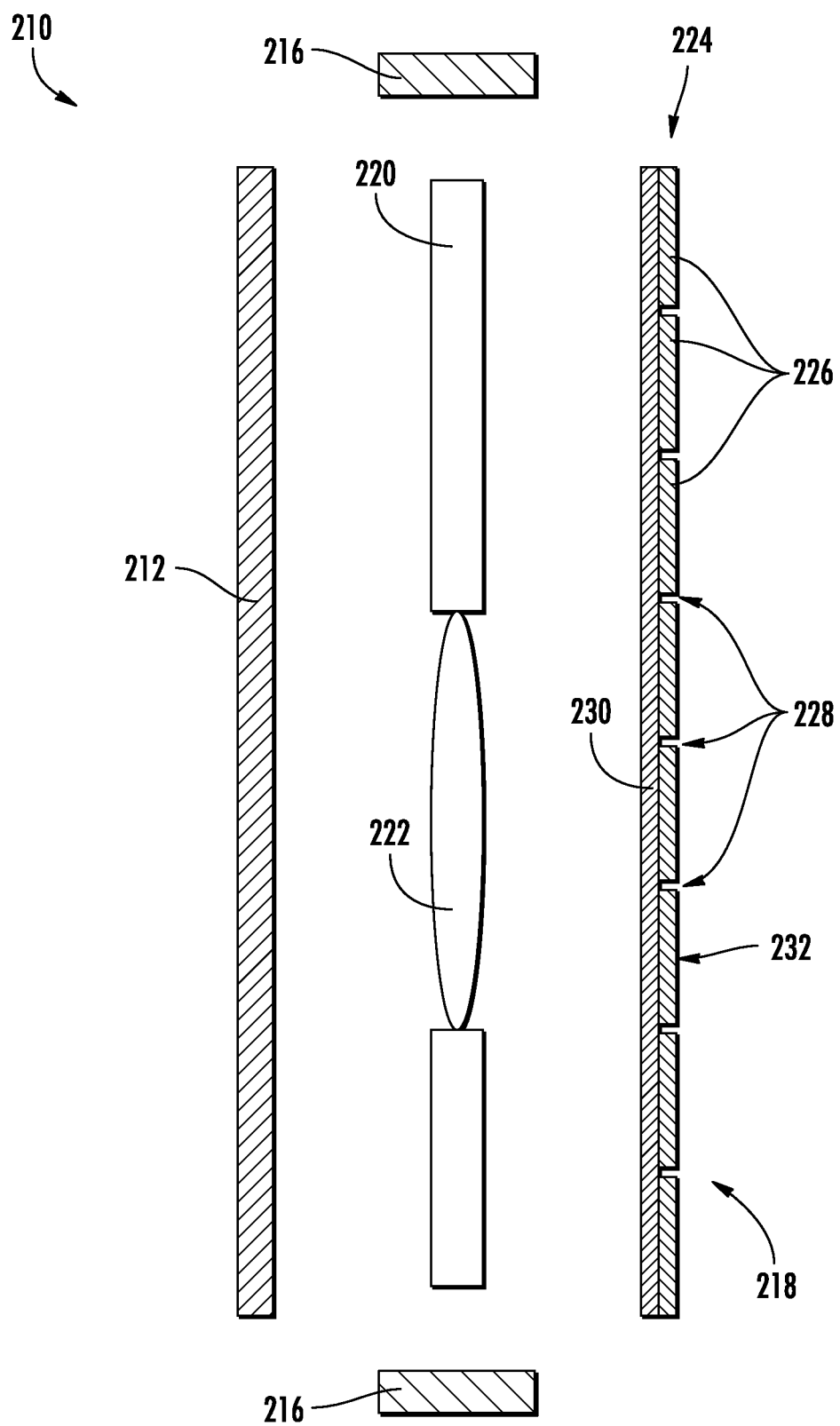
FIG. 2 is a conceptual diagram in exploded cross-section from a side view of such a device as shown in FIG. 1, according to an exemplary embodiment.

Referring to FIG. 2, a device 210, similar to the device 110 of FIG. 1, includes a front face 212, sides 216, componentry 220, and a back cover 218 on the other side of the componentry 220 from the front face 212. The componentry 220 may include electronic components, such as microprocessor, control logic, memory, battery, etc. According to an exemplary embodiment, the componentry 220 may further include a coil 222, such as a spirally wound wire configured to receive energy from an electromagnetic field through induction for wireless charging or powering.

According to an exemplary embodiment, the back cover 218 serves as housing for the device 210, on the opposite side of the device 210 from a display on the front face 212, and the back cover 218 may further extend around sides of the device 210 in some embodiments, such as where the sides 216 are integrally connected with the back cover 218. In some devices, the front face 212 and back cover 218 may not be strictly parallel with one another, such as where the front face 212 may be curved and the back cover 218 may extend along a relatively flat plane.

According to an exemplary embodiment, the back cover is metallic meaning that metal (e.g. aluminum, aluminum alloy, stainless steel, brass, etc.) overlays most of the back cover 218, such as almost all, greater than 80%, greater than 90% of surface area of the back cover 218. In other embodiments, the back cover is at least partially metallic meaning that metal (e.g. aluminum, aluminum alloy, stainless steel, brass, etc.) overlays some of the back cover 218, such as at least 5% of surface area, but less than most of the surface area. The metal may be coated, anodized, oxidized, painted, etc., and the back cover 218 may include additional layers, such as cushioning layers, dielectric coatings, etc.

A metallic cover may have an aesthetic appeal, in term of perceived ruggedness of metal, heat absorbing tactile feeling, etc. however metallic back covers in general may interfere with componentry of devices, such cellular phones and tablet computers, by absorbing wireless charging power and/or blocking electromagnetic transmissions for example. However, Applicants find that parsing metal of the back cover 218 into pieces of metal 226 may facilitate wireless charging through the back cover 218 by obstructing eddy currents in the metal, allowing more energy and/or electromagnetic radiation to transfer to the coil 222 when compared to a cover formed from a solid, continuous piece of metal. Applicants experimented with different designs and found that division of the metallic back cover 218 into more and thinner pieces of metal 226 that are electrically separated from one another improved wireless charging capability.

Figure 3:
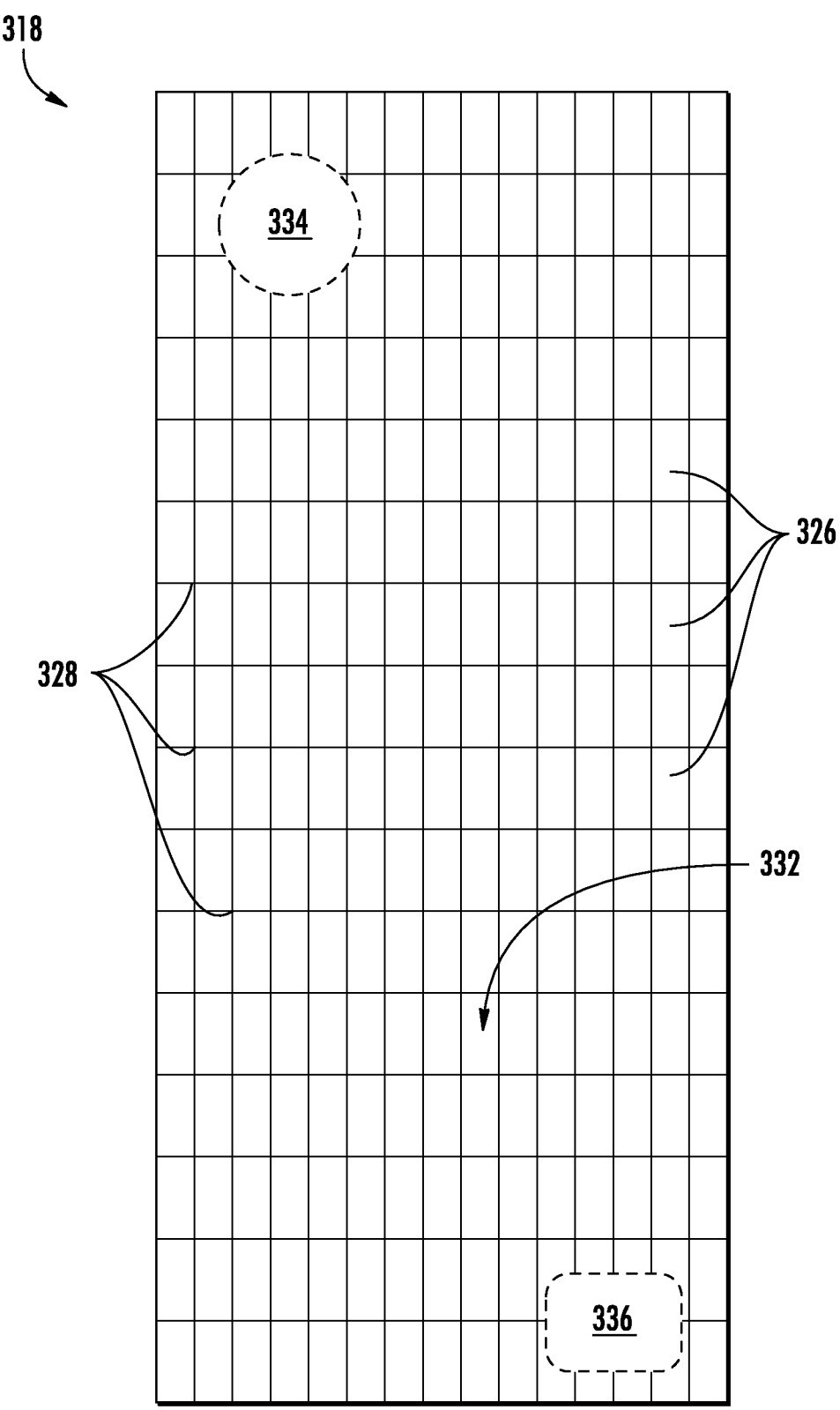
FIG. 3 is a conceptual diagram of a back cover of such a device as shown in FIG. 1, according to an exemplary embodiment.

Still referring to FIG. 2 and additionally to aspects of FIG. 3, according to an exemplary embodiment the back cover 218 includes an arrangement 224 (e.g., blanket, covering, layer, array, pattern) of pieces of metal 226. According to an exemplary embodiment, the pieces of metal 226 have front and back major surfaces joined by side edges, such that the pieces of metal 226 are generally small sheets. For example, the front and back major surfaces have surface areas far greater than the side edges, such as at least ten times, at least fifty times, at least 100 times greater in area. Further, in such embodiments, the pieces of metal 226 are oriented such that the front major surfaces face the componentry and the back major surfaces face away from the componentry. In FIG. 2, the outward facing surface of the pieces of metal 226 is the back major surface 232, and the view in FIG. 2 shows side edges of the pieces of metal 226. By contrast, FIG. 3 shows back major surfaces 332 of respective pieces of metal 326.

In FIG. 2 and according to an exemplary embodiment, the pieces of metal 226 are supported (e.g., held in place) and coupled to (e.g., bonded to, fixed to) a substrate 230, where the substrate 230 is less electrically conductive than the pieces of metal 226, such as less than half, an order of magnitude less, two orders of magnitude less electrically conductive. According to exemplary embodiments, the substrate 230 may be glass, glass-ceramic, ceramic, polymer, plastic, thermoplastic, polyetherimide, polyether ether ketone, rubber, a composite, a dielectric material, etc.

According to an exemplary embodiment, the pieces of metal 226 are separated from one another by electrical insulation 228, 230, where the electrical insulation 228 is in the form of voids or channels, where the air electrically insulates in combination with the substrate 230, which limit electrical connection between the pieces of metal 226. In other embodiments, the electrical insulation 228 between the pieces of metal 226 may be a caulk, which may be a dielectric polymer, organic resin, etc. or any of the materials of the substrate 230 that obstructs electrical connectivity between pieces of metal 226. In other embodiments, material of the substrate 230 may continuously extend up in between sides of the pieces of metal 226 filling the channels between the pieces of metal 226 shown in FIG. 2. In still other embodiments, electrical insulation 228 between pieces of metal 226 may also sufficiently hold the pieces of metal 226 together, without the substrate 230 included. According to an exemplary embodiment, a perimeter of the back major surface 232 of the pieces of metal 226 is fully surrounded by the electrical insulation 228, as also shown in FIG. 3 with pieces of metal 326 and electrical insulation 328, where the piece of metal 226 may be electrically isolated and essentially an island on the plane of the back major surface 232. In some embodiments, the back cover 218 does not include a substrate.

In some embodiments, metal of the pieces of metal 226 has resistivity greater than $50 \times 10^{-9}$ $\Omega$m, such as greater than $500 \times 10^{-9}$ $\Omega$m. According to an exemplary embodiment, resistivity of the electrical insulation 228, 230 is at least an order of magnitude greater (i.e. at least ten times) than resistivity of the pieces of metal 226, such as at least two orders of magnitude greater (i.e. at least one-hundred times). In some embodiments, metal of the pieces of metal 226 is a metal other than aluminum or an alloy thereof, and/or resistivity of the metal is at least an order of magnitude greater than resistivity of pure, single-crystal aluminum. In some embodiments, the metal of the pieces of metal 226 is a metal that is not ferromagnetic. In some embodiments, the metal is a stainless steel. In contemplated embodiments, the metal may be ferromagnetic. In other embodiments, metal of the pieces of metal 226 has resistivity less than $50 \times 10^{-9}$ $\Omega$m.

In contemplated embodiments, the pieces of metal 226 may be sandwiched between substrates or between the substrate 230 on the inside and a film or coating layer on the outside, where an outermost layer is translucent and/or particularly thin (e.g., less than 1 mm, less than 750 μm, less than 50 μm), such that the pieces of metal 226 are visible from the back of the device 210. In some embodiments, the outermost layer is not translucent. In other embodiments, the pieces of metal 226 form an outermost layer of the back cover 218, as shown in FIG. 2 for example. According to an exemplary embodiment, the pieces of metal overlay most of the back cover 218, such as at least 80% of the back cover 218, and/or less than all of the back cover 218. According to an exemplary embodiment, the pieces of metal overlay most of the componentry 220 between the back cover 218 and the front face 212, such as at least 80% of the componentry 220.

According to an exemplary embodiment, the back cover 218 is thin. In some embodiments, the coil 222 is less than 3 mm from the back major surface 232 of at least one of the pieces of metal 226, such as less than 2.5 mm, such as less than 2 mm. In some embodiments, the coil 222 is less than 3 mm from the outermost surface of the back cover 218, which is shown as the back major surface 232 in FIG. 2, but may be the outward surface of a coating, film, substrate, etc. in other embodiments as disclosed herein. In some such embodiments, the pieces of metal 226 have a thickness less than 2 mm, such as a thickness less than 750 μm, such as a thickness of 500 μm or less, and/or at least 50 μm. In other such embodiments, the pieces of metal 226 are thicker than 2 mm, such as have a thickness less than 20 mm.

Referring to FIG. 3, a back cover 318, similar to the back cover 218 of FIG. 2, includes an arrangement of pieces of metal 326. According to an exemplary embodiment, the pieces of metal 326 do not directly contact one another, but are instead separated from one another by electrical insulation 328. In some embodiments, the back cover 318 may include features, such as a camera opening 334, a port 336, or other features. The back cover 318 may be relatively flat, as shown in FIGS. 2-3, or may have curvature, such as forming both back and integral sides (see, e.g., sides 216 of housing) of the device housing. Separating of the pieces of metal 326, as shown in FIGS. 2-3 may allow for aesthetics of a metal case and may also provide flexibility to the case, such as if the electrical insulation 328 additionally serves as joints or hinges for bending the back cover 318. Such flexibility and corresponding deformation may also absorb impact loading, if the device is dropped.

According to an exemplary embodiment, the back cover 318 includes at least five of the pieces of metal 326, such as at least 10, at least 15, at least 20. In other embodiments, the back cover 318 includes fewer than fifty of the pieces of metal 326, such as fewer than 10. In some embodiments, the pieces of metal 326 have a major surface 332 (see also surface 232 of FIG. 2) facing away from the componentry (e.g., componentry 220 of FIG. 2) that has an area of less than 4 cm$^2$ per piece, such as less than 1 cm$^2$, less than 50 mm$^2$, and in some embodiments less than 25 mm$^2$, and/or at least 250 μm$^2$. In some embodiments, the back major surfaces 332 of at least some (e.g., most, all) of the pieces of metal 326 each have a cross-sectional dimension (e.g., width, length, diagonal, diameter), linearly spanning the major surface thereof, that is less than 3 cm and may also include another such cross-sectional dimension at least 2 mm. Applicants have found that dimensions of the pieces of metal 326 impact wireless charging efficiency, and also may influence other attributes of the back cover 318 such as aesthetics, flexibility, cost, etc. While FIG. 3 shows the major surface 332 of the pieces of metal 326 to be rectangular, Applicants contemplate a wide variety of shapes, such as floor tile patterns, jigsaw puzzle patterns, hexagons, squares of varying sizes, etc. The pieces of metal 326 may also have textures other than smooth and flat, which may provide benefits in addition to aesthetics, such as improved grip, transmission of electromagnetic radiation, etc.

Figure 4:
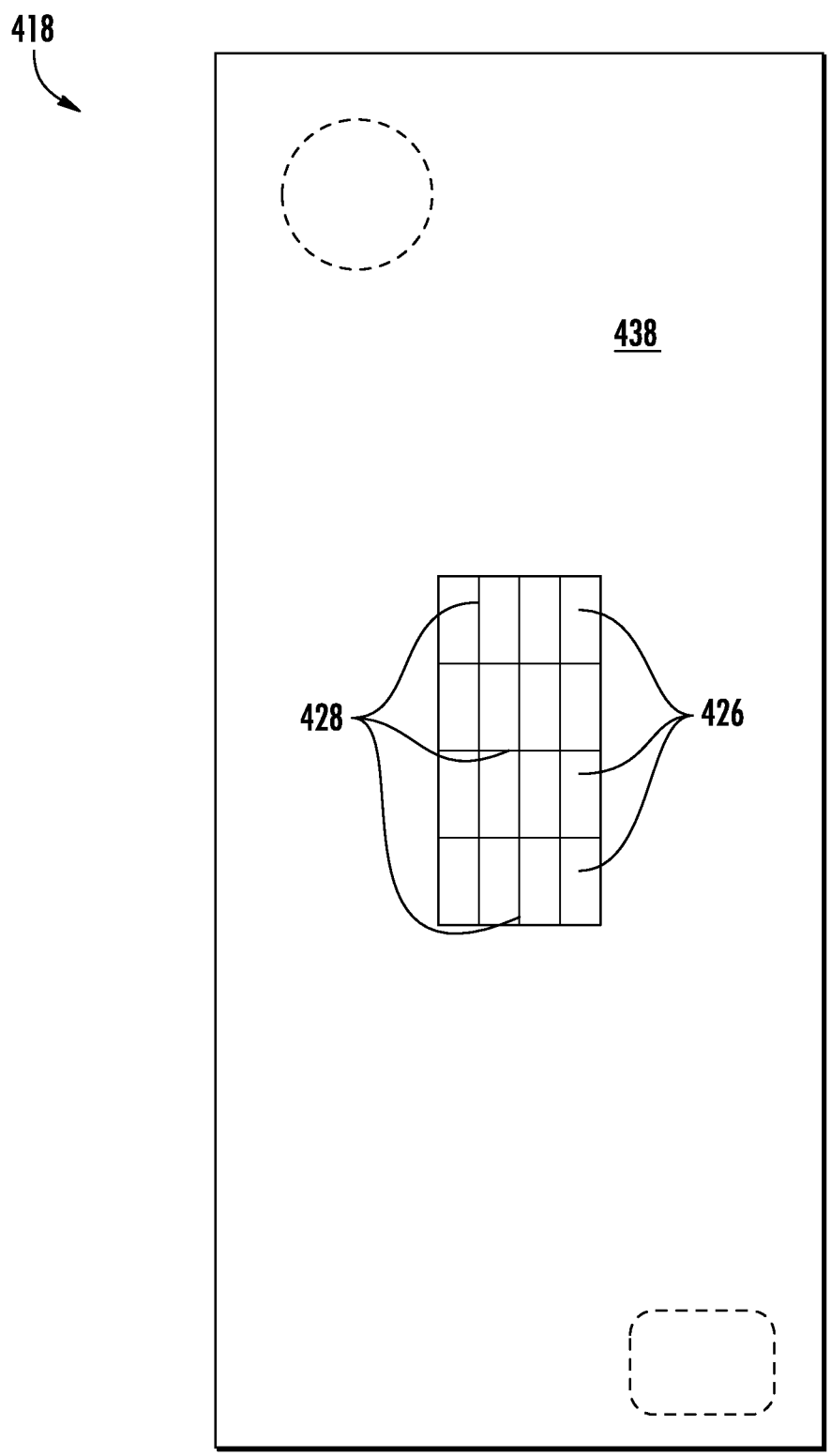
FIG. 4 is a conceptual diagram of a back cover of such a device as shown in FIG. 1, according to another exemplary embodiment.

Referring to FIG. 4, in some contemplated embodiments, a back cover 418 is metallic and includes pieces of metal 426, but the pieces of metal 426 only cover a relatively small portion or subset of the back cover 418. Other portions of the back cover 418 may be metallic and contiguous, such as covered by a metal frame 438. Such an arrangement may influence flexibility of the cover, but may be cost efficient and/or still allow for improved wireless charging relative to an entirely solid, integral, monolithic, metallic cover, such as where an inductive coil is located proximate to the pieces of metal 426. Metal of the frame 438 may differ from metal of the pieces of metal 426 in some embodiments, such as with an aluminum frame and stainless steel pieces of metal for example.

In some contemplated embodiments, the pieces of metal 426 may support or be used as components of an antenna array, where additional elements (e.g., switch, filter, processor, circuitry) of such an antenna array are in the componentry (e.g., componentry 220) of the respective device and coupled to the pieces of metal 426 integrated with the back cover 418. Such a use may only require a portion of the back cover 418 where the pieces of metal 426 are electrically separated by insulation 428 as disclosed herein. Such an antenna array may facilitate transmission at frequencies above 20 GHz, directional signals, etc., for example, and may also or alternatively be integrated into sides (see, e.g., sides 216) of the respective device. Further, referencing to FIG. 3, such an antenna array may also use only some of the pieces of metal 326 of the back cover 318, while others of the pieces of metal 326 may serve aesthetic purposes, allow wireless charging, provide housing flexibility, etc.

The construction and arrangements of the methods and products, as shown in the various exemplary embodiments, are illustrative only. Although only a few embodiments have been described in detail in this disclosure, many modifications are possible (e.g., variations in sizes, dimensions, structures, shapes, and proportions of the various elements, values of parameters, mounting arrangements, use of materials, colors, orientations) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:
1. A cellular phone or tablet computer device, comprising:
a front face having a display screen;
a back cover opposite the front face; and
componentry between the front face and back cover, wherein the componentry comprises a coil for receiving power through induction,
wherein the back cover comprises pieces of metal coupled to a substrate, wherein the pieces of metal are separated from one another by electrical insulation,
wherein the pieces of metal comprise front and back major surfaces joined by side edges, and are oriented such that the front major surfaces face the componentry and the back major surfaces face away from the componentry, wherein the substrate and the pieces of metal separated from one another by electrical insulation obstruct eddy currents within each one of the pieces of metal when the coil receives power through induction, and
wherein the back major surfaces of the pieces of metal each have an area of less than 4 cm$^2$.

2. The device of claim 1, wherein the pieces of metal are thin such that a thickness of each of the pieces of metal is less than 2 mm, where the thickness is a distance between respective major surfaces.

3. The device of claim 2, wherein the thickness of each of the pieces of metal is less than 750 μm.

4. The device of claim 2, wherein the back cover of the device comprises at least ten of the pieces of metal.

5. A cellular phone or tablet computer device, comprising:
a front face having a display screen;
a back cover opposite the front face; and
componentry between the front face and back cover, wherein the componentry comprises a coil for receiving power through induction, and wherein the coil is less than 3 mm from the back major surface of at least one of pieces of metal,
wherein the back cover is metallic,
wherein the back cover comprises pieces of metal coupled to a substrate, the pieces of metal having front and back major surfaces joined by side edges,
wherein the pieces of metal are oriented such that the front major surfaces face the componentry and the back major surfaces face away from the componentry,
wherein perimeters of each of the back major surfaces of the pieces of metal are fully surrounded by electrical insulation,
wherein the substrate and the pieces of metal surrounded by the electrical insulation obstruct eddy currents within each one of the pieces of metal when the coil receives power through induction,
wherein a thickness of each of the pieces of metal is less than 2 mm, where the thickness is a distance between respective major surfaces, and
wherein the back major surfaces of the pieces of metal each have a cross-sectional dimension less than 3 cm and another cross-sectional dimension at least 2 mm.

6. The device of claim 5, wherein the back cover comprises at least ten of the pieces of metal.

7. The device of claim 6, wherein the thickness of each of the pieces of metal is less than 750 μm.

8. The device of claim 5, wherein the pieces of metal overlay most of the back cover.

9. The device of claim 8, wherein the pieces of metal overlay at least 80% of the back cover.

10. The device of claim 5, wherein metal of the pieces of metal is not ferromagnetic.

11. The device of claim 5, wherein at least some of the pieces of metal are coupled to the componentry and form an antenna array.

12. The device of claim 11, wherein the back cover further comprises a metal frame surrounding the pieces of metal.

13. The device of claim 5, wherein resistivity of the electrical insulation is at least an order of magnitude greater than resistivity of metal of the pieces of metal.

14. The device of claim 13, wherein the metal has resistivity greater than $500 \times 10^{-9}$ Ωm.

15. The device of claim 13, wherein resistivity of the metal is at least an order of magnitude greater than resistivity of pure, single-crystal aluminum.

16. A cellular phone or tablet computer device, comprising:
a front face having a display screen;
a back cover opposite the front face, wherein the back cover comprises five or more pieces of metal coupled to a substrate, the five or more pieces of metal each having front and back major surfaces joined by side edges, wherein the pieces of metal overlay at least 80% of the back cover, and wherein the pieces of metal each do not directly contact any of the other pieces of metal; and
componentry between the front face and back cover, wherein the componentry comprises a coil for receiving power through induction, wherein the substrate and the five or more pieces of metal obstruct eddy currents within each one of the pieces of metal when the coil receives power through induction.

17. The device of claim 16, wherein the pieces of metal are oriented such that the front major surfaces face the componentry and the back major surfaces face away from the componentry, and wherein the coil is less than 3 mm from the back major surface of at least one of pieces of metal.

18. The device of claim 17, wherein metal of the pieces of metal has resistivity greater than $50 \times 10^{-9}$ Ωm.

19. The device of claim 18, wherein the back major surfaces of each of the pieces of metal have an area of less than 4 cm$^2$.

* * * * *

UNITED STATES PATENT AND TRADEMARK OFFICE
CERTIFICATE OF CORRECTION

PATENT NO. : 11,449,106 B1
APPLICATION NO. : 16/521706
DATED : September 20, 2022
INVENTOR(S) : Colin Brendan Daly et al.

It is certified that error appears in the above-identified patent and that said Letters Patent is hereby corrected as shown below:

On the Title Page

On the page 2, in Column 2, Item (56) under "Other Publications", Line 26, delete "nductive" and insert -- Inductive --.

Signed and Sealed this
First Day of August, 2023

Katherine Kelly Vidal
*Director of the United States Patent and Trademark Office*